US012730094B2

(12) United States Patent
Kopp et al.

(10) Patent No.: US 12,730,094 B2
(45) Date of Patent: Sep. 8, 2026

(54) DETERMINATION OF PEAKING OF PIPES

(71) Applicant: NDT Global Corporate Ltd., Dublin (IE)

(72) Inventors: Gerhard Kopp, Karlsruhe (DE); Michael Frank, Karlsdorf-Neuthard (DE)

(73) Assignee: NDT Global Corporate Ltd., Dublin (IE)

(*) Notice: Subject to any disclaimer, the term of this patent is extended or adjusted under 35 U.S.C. 154(b) by 310 days.

(21) Appl. No.: 18/685,121

(22) PCT Filed: Aug. 23, 2022

(86) PCT No.: PCT/EP2022/073399
§ 371 (c)(1),
(2) Date: Feb. 20, 2024

(87) PCT Pub. No.: WO2023/025762
PCT Pub. Date: Mar. 2, 2023

(65) Prior Publication Data
US 2024/0377365 A1 Nov. 14, 2024

(30) Foreign Application Priority Data
Aug. 23, 2021 (WO) ................. PCT/EP2021/073285

(51) Int. Cl.
*G01N 29/44* (2006.01)
*G01N 29/04* (2006.01)
*G01N 29/265* (2006.01)

(52) U.S. Cl.
CPC ......... *G01N 29/4454* (2013.01); *G01N 29/04* (2013.01); *G01N 29/265* (2013.01);
(Continued)

(58) Field of Classification Search
CPC ...... G01N 29/043; G01N 29/04; G01N 29/46; G01N 29/265; G01N 29/4454;
(Continued)

(56) References Cited

U.S. PATENT DOCUMENTS 4,964,059 A * 10/1990 Sugaya .................. G01N 29/07 73/598
5,583,292 A * 12/1996 Karbach .............. G01N 29/223 73/638
(Continued)

FOREIGN PATENT DOCUMENTS

DE 3853323 T2 9/1995
DE 10 2011 109 717 B3 10/2012
(Continued)

OTHER PUBLICATIONS

International Search Report issued in International Application No. PCT/EP2022/073399, mailed Nov. 17, 2022, 6 pages.
(Continued)

*Primary Examiner* — John Fitzgerald
(74) *Attorney, Agent, or Firm* — McDonnell Boehnen Hulbert & Berghoff LLP

(57) ABSTRACT

In a method for determining the seam peaking of a pipeline, measured values of the internal pipe geometry are recorded adjacent to a sought point P of the seam peaking, at which the measurement of meaningful measured values is difficult or impossible due to a weld seam present there, and a trend is determined from the measured values and a value of the seam peaking is determined on the basis of the trend.

9 Claims, 3 Drawing Sheets

Figure 1:
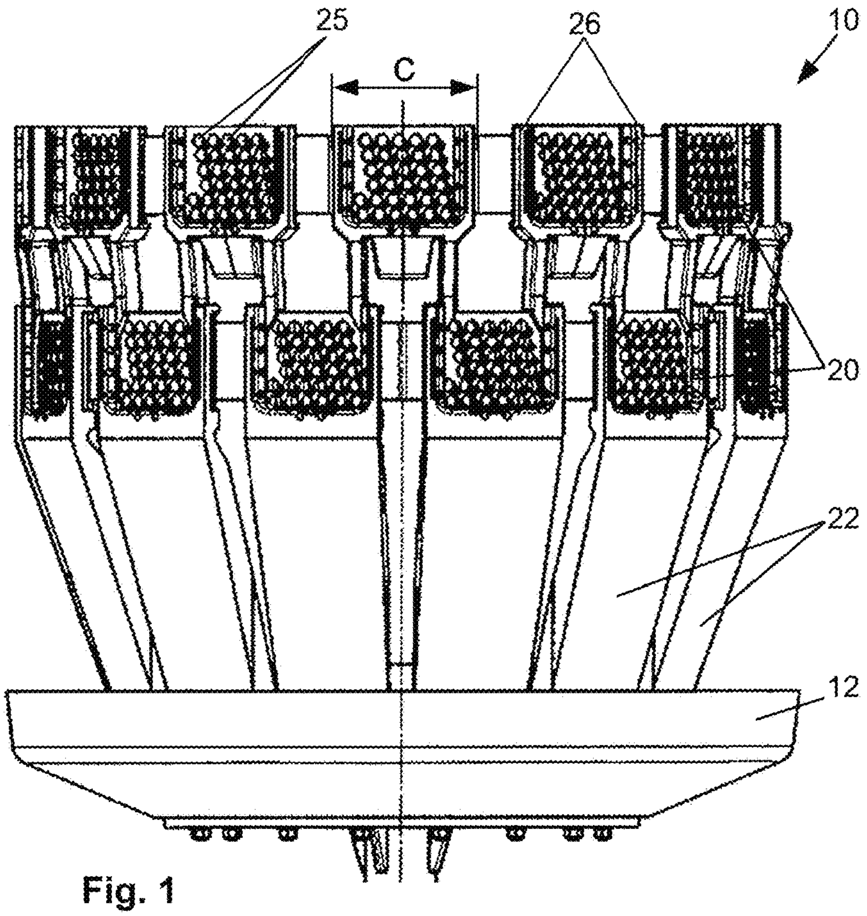

(52) U.S. Cl.
CPC . *G01N 29/4427* (2013.01); *G01N 2291/0289* (2013.01); *G01N 2291/2636* (2013.01); *G01N 2291/2675* (2013.01)

(58) Field of Classification Search
CPC ... G01N 2291/0289; G01N 2291/2636; G01N 2291/2675; F16L 2101/30; G01B 17/06
See application file for complete search history.

(56) References Cited

U.S. PATENT DOCUMENTS

| | | | | |
|---|---|---|---|---|
| 7,168,322 | B2 * | 1/2007 | Bardoux | G01N 29/0645 73/628 |
| 9,354,205 | B2 * | 5/2016 | Schwarz | G01N 29/07 |
| 10,940,564 | B2 * | 3/2021 | Reiz | B29C 65/1432 |
| 2004/0031337 | A1 * | 2/2004 | Masaniello | G01N 29/4445 73/865.8 |
| 2019/0162700 | A1 * | 5/2019 | Andrew | G01N 17/04 |
| 2019/0323828 | A1 | 10/2019 | Hiramoto et al. | |
| 2019/0383784 | A1 * | 12/2019 | Krynicki | G01N 29/4436 |
| 2021/0031309 | A1 * | 2/2021 | McGovern | B23K 31/125 |

FOREIGN PATENT DOCUMENTS

| | | | |
|---|---|---|---|
| JP | 2001201327 A | * | 7/2001 |
| JP | 2011058916 A | | 3/2011 |

OTHER PUBLICATIONS

Written Opinion issued in International Application No. PCT/EP2022/073399, mailed Nov. 17, 2022, 7 pages.

* cited by examiner

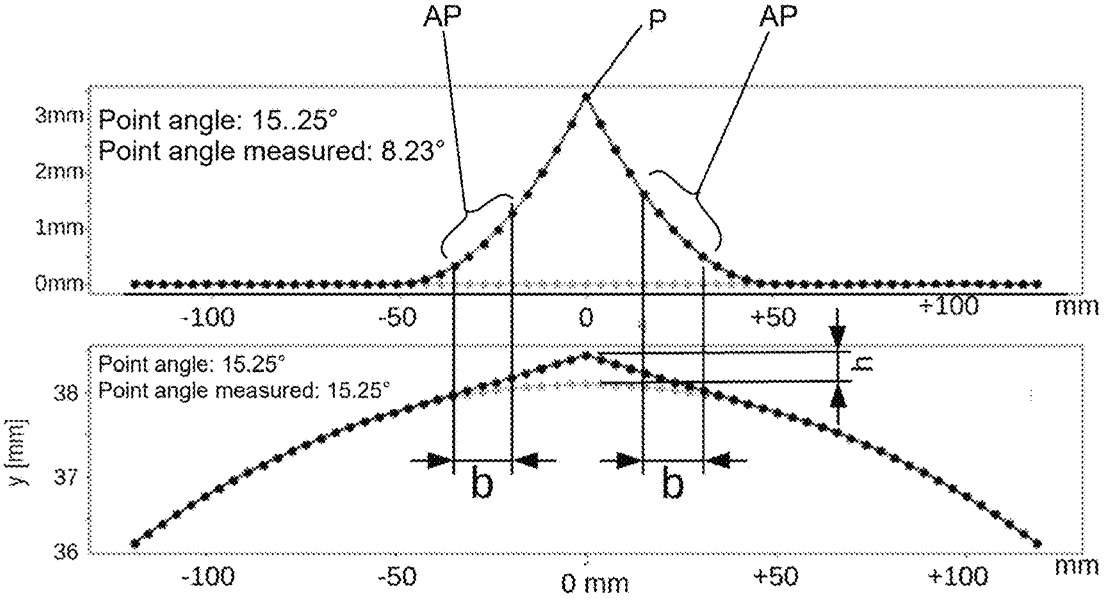
Fig. 2
AMENDED $$h = R \cdot \left(\frac{1}{\cos\theta} - 1\right)$$

Detail A:

DETERMINATION OF PEAKING OF PIPES

CROSS REFERENCE TO RELATED APPLICATIONS

This application is the US national phase under 35 U.S.C. § 371 of International Application No. PCT/EP2022/073399, filed Aug. 23, 2022, which claims priority to International Application No. PCT/EP2021/073285, filed Aug. 23, 2021, the contents of each of which are hereby incorporated by reference in their entirety.

BACKGROUND OF THE INVENTION

(1) Field of the Invention

The present invention relates to a method for seam peaking determination, a pig and a computer program product.

(2) Description of Related Art Including Information Disclosed Under 37 CFR 1.97 and 1.98

It is generally known that, particularly in the case of longitudinally welded pipes, production-related out-of-roundnesses can occur, known as "seam peakings", which are located in the area of the weld seam and are detrimental. These deviations from the theoretical roundness can lead to increased crack formation in and around the weld seam when the pipes are subjected to pressure and thus to leaks in the pipe or pipeline. It is known that seam peaking has a significant influence on the fatigue behaviour of pipes. In principle, this is due to the fact that a seam peaking creates a stress-increasing notch effect. The influence of cracks within the seam peaking is also greater, so that failure occurs earlier. The collapse of a high seam peaking with a crack is to be assessed as a critical condition. For example, cracks with a crack depth of only 0.1 mm, which have sufficient safety reserve if they are located outside a seam peaking, become critical if they occur at points with a high seam peaking of approx. 6 mm. If, due to the production process, seam peakings are regularly unavoidable, they must be labelled as precisely as possible and taken into account accordingly when calculating the probability of failure.

Measuring cracks at the weld seam with a high seam peaking is often only possible to a limited extent due to the geometry, as the angle of incidence can vary greatly, for example theoretically up to 8.8° with a seam peaking of 6 mm in a pipeline with a diameter of 40 inches. The safety of pipelines is therefore often determined by means of a stress test with pressure increase. These static or cyclic tests are not non-destructive, as the pipes that are damaged burst. However, even pipes that do not burst are further damaged by the stress test and their remaining useful life is shortened. In order to minimise the high effort and costs of these stress tests, attempts are being made to measure the seam peaking with an intelligent pig. Comparative values are used to determine what maximum seam peaking is still acceptable. In principle, an ultrasonic measuring sensor can be used to measure the seam peaking, as is regularly used to measure the pipe thickness or cracks. The additional use of this already required sensor for determining the seam peaking is advantageous, as no (further) separate measuring equipment is required. However, as conventional ultrasonic sensors have a number of sensor carriers around the circumference, which are pressed radially outwards against the inner wall of the pipe, there is a risk of the measured value being falsified if a sensor carrier is completely or partially pressed into a seam peaking. This means that the sensor carrier can either be pressed radially outwards without tilting/twisting, which reduces the measured result accordingly, or if the sensor carrier is partially immersed in a seam peaking, twisting can also occur and both of these effects are equally negative.

DE 10 2011 109 717 B3 discloses a method for measuring the seam peaking of a pipeline using ultrasound, in which a sensor carrier is used. It was recognised that the sensor carrier can be at least partially immersed in a seam peaking, which can result in a lead deviation that makes it difficult to measure the seam peaking accurately. In order to reduce this problem, this paper comes to the conclusion that the sensor carrier should be provided with skids that have a skid width that is greater than the seam peaking width measured in the circumferential direction of the pipeline.

BRIEF SUMMARY OF THE INVENTION

The task of the present invention is to provide a method for measuring and calculating a seam peaking, which can generally be used for determining seam peakings and is independent of the method of collecting the measured values (in particular measured values of the inner wall of the pipe). In particular, the need for a sensor carrier of a certain minimum width should be largely avoided. In addition, the measured data should be usable for an improved determination of the seam peaking.

This task is solved with the features of the independent claims. Preferred further developments are the subject of the dependent claims.

In a method for determining the seam peaking of a pipeline, measured values of the internal pipe geometry are recorded adjacent to a sought point of the seam peaking where measurement is difficult or impossible, in particular because of a weld seam present there. The position of the measured values is therefore at a distance from the sought point of the seam peaking in the circumferential direction and a trend is determined from the measured values and a value of the seam peaking is determined on the basis of the trend. In particular, measured values that are measured directly at the longitudinal seam, i.e. at the maximum value of the seam peaking, are not used in the method for calculating the seam peaking. This immediate vicinity is at least as wide as the weld seam width. The aforementioned trend lies in particular in a tangential direction of the pipe at the corresponding point. A significant advantage of this is that the measured/determined angle is largely independent of the respective radial position and angular orientation (=twist) of the sensor carrier that records the measured values or that the angular position can be subtracted out. A trend determination from measured values can be carried out in particular in such a way that it is first roughly estimated where a seam peaking could be present and at least two measured values are recorded radially around both sides and extrapolated linearly in such a way that an intersection point is obtained which then corresponds to the sought point of the seam peaking. As an alternative to the above-mentioned "rough estimate", a large number of measured values can also be recorded around the cross-section, which are then compared in pairs, for example, in order to determine a gradient and if the gradients have different signs, it can be concluded that there is a seam peaking in between. Other equivalent methods of trend determination are known to the skilled person. The number of sensors on the sensor carrier and, in particular, their distance from each other and the pipe diameter determine the sensitivity of the present method.

In particular, the distance from the measurement points that are used for the seam peaking determination to the point of the seam peaking being searched for can be greater than the distance between two neighbouring sensors. If the sensors are evenly distributed on the sensor carrier, this formulation expresses the fact that no measured values are used that were recorded adjacent to the point being searched for.

A basic idea of the invention is to determine the height of the seam peaking not directly via a maximum measured elevation directly at the weld seam, but to derive it from the seam peaking angle. This is because protrusions of the weld metal can protrude inwards at the weld seam as a "weld bead". These protrusions are not of interest for determining the seam peaking, but are actually detrimental, as they reduce the measurement result and thus falsify it. These protrusions are not considered in the method described. Therefore, to determine the angle, measurements are not taken directly on the longitudinal seam (where experience shows that the data quality is poor), but measurements next to the longitudinal seam can be used, which generally provide significantly better data quality. Finally, one does not have to rely on a single measurement to determine the angle, but can use several adjacent measurements to the right and left of the longitudinal seam, which significantly reduces the susceptibility to interference. To determine the seam peaking angle, the measured lift-offs must first be projected onto the real pipe geometry. The respective gradients are then determined using reference points to the left and right of the longitudinal seam. This can be done using any averaging method, such as linear regression in particular.

To determine the position of the weld seam, neighbouring measured values in particular can be compared with each other wherein a search is made for outliers, which serve as an indication of the presence of the weld seam at this point. Alternatively or additionally, measurement data from one or more previous measurements at other axial points of the pipeline can be used to determine the presence of the weld seam at a specific point. In addition, a distance between measured values can be defined which corresponds to at least half of the weld seam width, but is preferably increased by a safety value such as at least 10%, for example 20%. And outliers determined in this way and/or measured values at locations of the expected weld seam are not used to determine the seam peaking.

Preferably, a sensor carrier is used in the method, which comprises a plurality of sensors and which is arranged in the pipe in such a way that at least two measured values of the distance from a sensor to the inner pipe wall are recorded on both sides of the searched point in the circumferential direction of the pipe, and that an angular position of the inner pipe wall is determined in each case and the sought point of the seam peaking is determined via an intersection of the angular positions. With conventional methods, the sensor carrier usually had to be so wide that it completely bridged the entire width of an expected seam peaking. This is because if at least one of the skids that guides the sensor carrier opposite the inner wall of the pipe is submerged, the measured values are falsified. This led to the additional expense that the sensor carriers not only had to be designed in multiple rows, but it also had to be ensured that the measured values provided uninterrupted measured values of the inner pipe geometry in multiple rows. Due to the realisation that it is sufficient to use gradients of the measured values, i.e. angular positions from the inner pipe wall to the sensor carrier, sensor carriers of a smaller width can be used, or meaningful measured values can be obtained even if the actual width of the seam peaking is greater than a previously expected maximum width.

Alternatively or additionally, the method can also be described in such a way that at least two points of the inner surface of the pipe are determined in the circumferential direction of the pipe on either side of the point of the seam peaking being searched for, which are each approximated, in particular interpolated, to a straight line and the point of intersection of which is determined as the sought point of the seam peaking. The position of the points does not have to be determined in a fixed coordinate system, but it is sufficient if it takes place relative to the sensor carrier(s) whose sensors have determined the points as the distances to them. It makes sense to measure the points used to determine the straight lines on both sides of the determined position of the weld seam. Outliers that indicate the weld seam are not used in the calculation and/or attention is paid to a sufficient distance to the specified position of the weld seam. Measuring points are recorded on both sides of the weld seam by different sensors.

In a preferred further development of the method, to form the trend in an averaging, optionally: a:) a plurality of measured values are used via a linear regression to obtain the angular position or the straight line, b:) neighbouring sensors each determine an inclination of the inner wall of the pipe and the median value of these inclinations is used to determine the angular position, c.) spatially neighbouring sensors each determine an inclination of the inner wall of the pipe and it is checked whether these inclinations contain an outlier and only inclinations are used to form a median value which, seen from the outlier, are adjacent to the point being searched for. In the variant according to a:), the slopes are determined and the effect of falsified measured values is reduced by linear averaging. Individual falsified measured values therefore have a lower weighting. And this method is improved according to b:) in such a way that it was recognised that, for example, measurement results can show jumps at the transition from one sensor carrier to the other. And by forming individual slopes in conjunction with their median values, outliers cannot be considered. And in c:) it was recognised that good measured values are achieved precisely when only measured values from within a sensor carrier are considered. This is achieved by the fact that there is a transition between the sensor carriers in the case of the "outlier" mentioned and then (in relation to the point being searched for) only points inside it are taken into account. As the control system has the information on which sensor carrier the respective sensors are located when analysing the measured values, this information can alternatively (or additionally) also be used to calculate the seam peaking, so that, if applicable, only measured values from one sensor carrier are used in each case.

It is also advantageous if, in the event that the seam peaking has a negative sign and therefore corresponds to a retraction, the measured values are mirrored using the ideal circular arc geometry, the calculations are then carried out to determine the seam peaking, the calculated value of the seam peaking is mirrored using the ideal circular arc geometry and the extent of the retraction, i.e. the actual position of the negative seam peaking, is determined using this. The reflections can be carried out using a Kelvin transformation, for example. When drawing in, the embodiment example shows that the points to be taken into account lie on an arcuate path, which can only be extrapolated with increased effort, or where a corresponding calculation has a risk of divergence. On the other hand, a simplified linear regression can be carried out based on a mirror image, analogous to the positive seam peaking. A mirroring of measured values via an ideal circular arc geometry can be carried out in particular in such a way that an idealised actual geometry of the pipe is first defined on the basis of many circulating measured values. Optionally, measured values that are outliers, such as those present with a seam peaking, can be used or not used. This actual geometry can be circular arc shaped or a curve interpolated around measurement points. A perpendicular (i.e. minimum) distance to this idealised actual geometry of the pipe is then calculated from the point that is to be mirrored and the actual mirroring is carried out in such a way that the perpendicular vector from the point to be mirrored to the perpendicular point on the pipe is doubled. This method is used in particular for longitudinal pipe seams.

In addition, it is advantageous if a sensor carrier is used that has a width in the circumferential direction of the pipe that corresponds to at least 70%, preferably at least 80% and particularly preferably at least 85% of an expected seam peaking width. And/or the sensor carrier can have a width that corresponds to a maximum of 130% of the expected seam peaking width and in particular a maximum of 100% of the expected seam peaking width. Very large widths of a sensor carrier can be disadvantageous because, depending on the inner diameter of the pipe, there may be increased distances between the sensors arranged in the centre of the sensor field of the sensor carrier and the inner wall of the pipe, which can have a negative effect on the measured values. Also, in the case of conventional devices, particularly when there is an extremely large seam peaking (especially with a large seam peaking width in the pipe tangential direction), which should actually require particularly close attention, a part of the sensor carrier may be immersed in the seam peaking (namely one of the skids in particular) and thus falsely lead to a low value of the seam peaking. This unfavourable effect can be avoided by using the inclinations or angular positions.

A corresponding pig may comprise, or be connected to, a controller which is adapted to perform one of the methods described herein. The term pig used also includes, in particular, that the pig can be provided with electronic control means and, in connection with software, this means that the software is stored in memories, in particular permanent memories, of the electronic control means.

In particular, the pig can be used to carry out a wall thickness measurement and/or a crack measurement in a pipe and can be equipped with a sensor carrier and a controller and/or software to carry out one of the methods described above. In the case of a wall thickness measurement, the direction of measurement is radially outwards, which makes it possible to use the measured values directly for the aforementioned calculations of the seam peaking. In contrast, when measuring for crack detection, the measurement angles can be orientated at an angle, making it necessary to process the measured values. However, as this is carried out by software, no additional costs are incurred when carrying out the measurements. The measured values can also be obtained using any other measurement methods such as laser time-of-flight measurement, triangulation or optical methods.

A corresponding computer program product, is loadable into a program memory and has program instructions to perform all steps of any of the methods described herein when the program is executed.

BRIEF DESCRIPTION OF SEVERAL VIES OF THE DRAWING(S)

Figure 3:
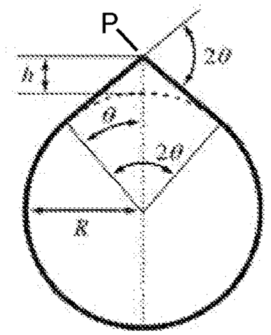
Figure 4:
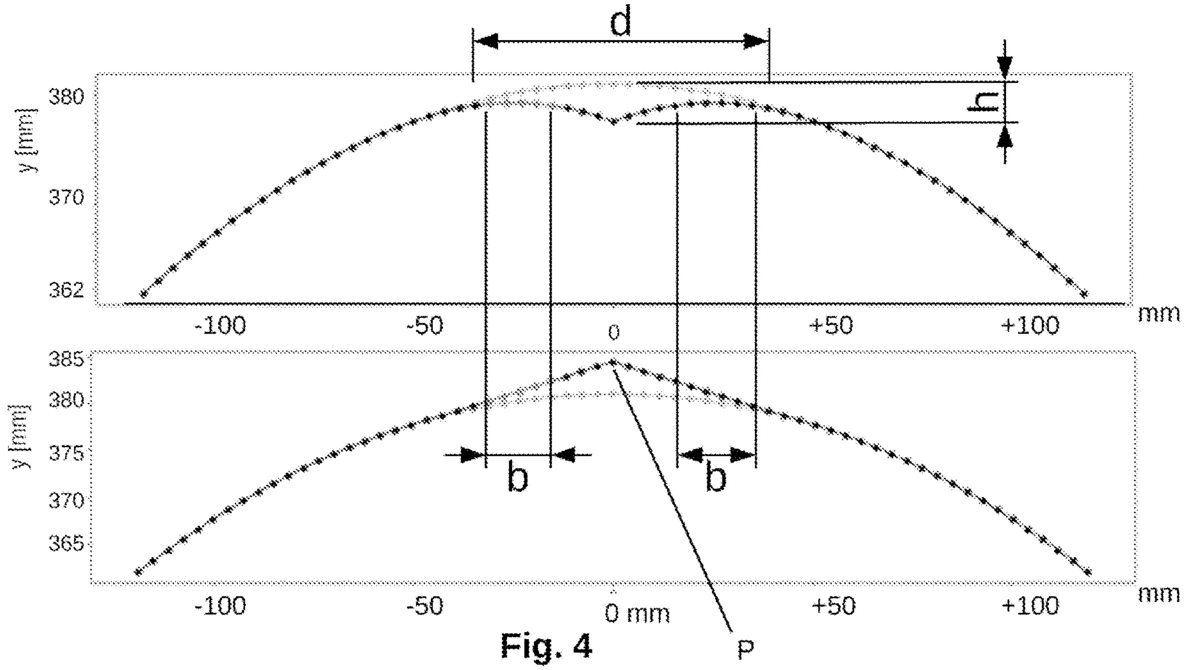
Figure 5:
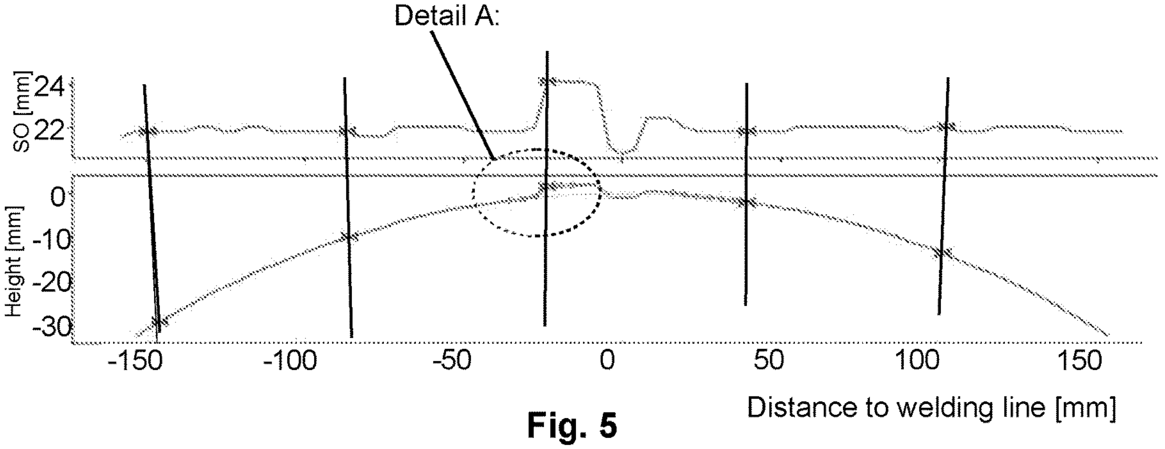
Figure 6:
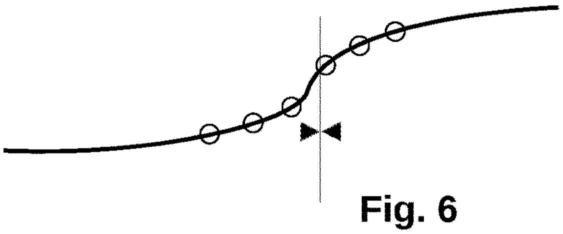
Figure 7:
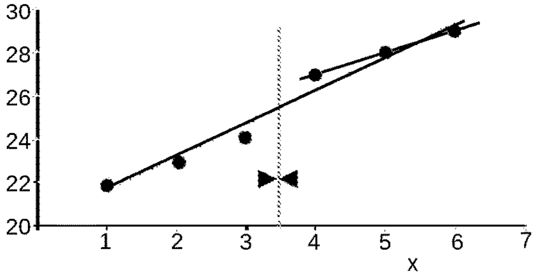
Figure 8:
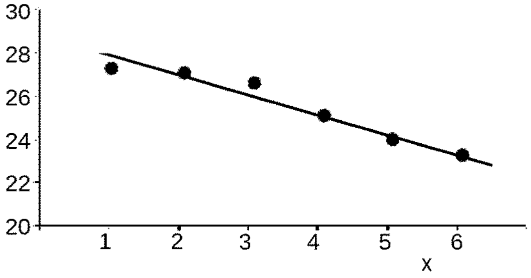
Figure 9:
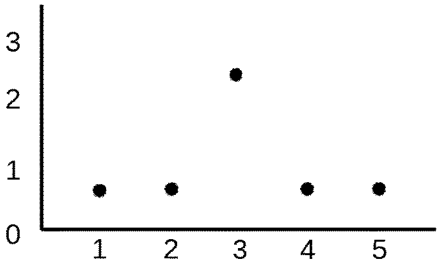
Figure 10:
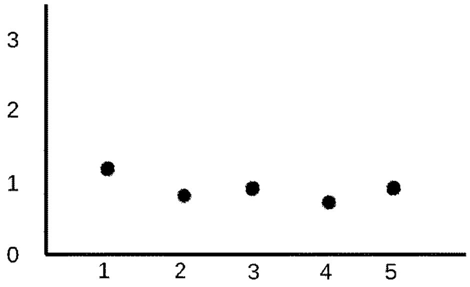

Preferred embodiments are described below by way of example with reference to the figures. The figures show:

FIG. 1 a sensor area of a part of a pig,

FIG. 2 a two-part diagram with model data,

FIG. 3 a graphic illustration to explain the calculation of the seam peaking height h, FIG. 4 a split diagram showing the seam peaking calculation for a negative seam peaking h, FIG. 5 an illustration explaining the processing of measurement results from sensors located on different sensor carriers, FIG. 6 a detail of FIG. 5, FIG. 7 a diagram of the measured values according to FIG. 5 on the left-hand side of the 0 mm position, i.e. the weld seam, FIG. 8 a diagram of the measured values to the right of the 0 mm position, i.e. the weld seam of FIG. 5, FIGS. 9 and 10 each show gradients of neighbouring measuring points of FIG. 7 and FIG. 8.

DETAILED DESCRIPTION OF THE INVENTION

FIG. 1 shows a pig 10 for use inside pipes with a disc-like base body 12 at the bottom, which is smaller by a certain amount than the associated pipe and which serves as a support for sensor carriers 20. For this purpose, arms 22 are used, one end of which is pivotably attached to the base body 12 and the other end of which is connected to a sensor carrier 20. The swivelling is such that the sensor carriers 20 can be moved radially outwards. Springs (not shown) are used for this purpose, which generate an outwardly directed force. The sensor carriers 20 each comprise a centre area in which an array of ultrasonic sensors 25 is arranged. The sensor carriers 20 comprise skids 26, between which the array of ultrasonic sensors 25 is arranged. The ultrasonic sensors are displaced back in relation to the skids, i.e. radially inwards in relation to the pig base body 10, so that when the pig 10 is in the pipe and the sensor carriers are pressed outwards, only the skids 26, but not the ultrasonic sensors 25, are in contact with the pipe. In addition to this swivelling capability, the sensor carriers 20 can be swivelled around the longitudinal axis of the pig so that, if possible, both skids 26 can lie against the pipe even if the inner contour of the pipe is uneven, which is also supported by the aforementioned springs. In addition, in the third of the three Cartesian rotational degrees of freedom, the sensor carriers 20 can optionally be swivelled in such a way that the skids can rest against the inner wall of the pipe along their length.

The sensor carriers 20 are arranged evenly in two axially offset rows, with the rows having an angular offset in the pig circumferential direction. This ensures that the inside of the pipe is evenly covered with sensor fields. If the sensors are spaced at a distance of 4 mm in the circumferential direction, for example, the entire inner circumference of the pipe can be analysed at a given axial position at each measuring point. By moving the pig in the pipe's axial direction, it is possible to examine the entire inner surface of the pipe without interruption, in particular with constant measuring point distances all round. The inspection can carry out a pipe thickness measurement in which the measuring direction of the sensors is directed radially outwards and/or a crack inspection can be carried out, and in this case the sensors are preferably orientated at an angle to the inner pipe surface. Instead of the configuration described, any sensor carrier can be used.

FIG. 2 shows in the upper part the idealised distances of the individual sensors 25 from the inside of the pipe as the so-called SO data (SO=stand off) with a seam peaking of height h. This is centred in the diagram and can result in particular from a longitudinal weld seam of the pipe. The distances from the weld line are plotted in millimetres on the horizontal axis. However, it is practically always the case that the measurement method shows inaccurate and even incorrect values in the direct vicinity of the seam peaking h. One of the reasons for this is that excess weld metal protrudes radially inwards and forms a so-called weld bead. It may therefore be necessary to analyse and select the measured data in order to determine the position of the weld seam. This is done, for example, by comparing neighbouring measured values with a search for outliers that are interpreted as protruding weld metal (or weld bead). And outliers determined in this way are not used to determine the seam peaking.

This material is used to measure reduced distances from the measured pipe geometry to the ideal circular geometry. These values do not correspond to the true seam peaking h and are not useful for calculating an increase in the probability of failure. Instead, the correct seam peaking h is required, which can be defined in particular as a widening of the pipe material in the area of the weld seam. If the measured values are too far away from the weld seam, they have no direct significance for the seam peaking h, so that they are also not used for its calculation. This leaves the measured values that can be used, which lie in the areas labelled “b” in FIG. 2. In the lower part of FIG. 2, the values were related to the circular geometry of the inner diameter of the pipe. This shows that the measured values within the areas b lie approximately on a straight line. A linear regression can be used to determine a gradient of the pipe wall within each of these areas b. Linear regression is applicable because, for simplicity’s sake, a constant gradient is assumed within the areas b. Based on the correlation in FIG. 3 and the formula shown, the seam peaking height h can be determined from the angle of the gradient Θ. The areas b that are used to determine the seam peaking height can, in particular, be directly adjacent to the area that is therefore not used to determine the seam peaking height, as the weld seam was expected in this area.

In other words, this relationship can also be seen in the lower part of FIG. 2, where the constant gradients within the areas b are extrapolated linearly, resulting in an intersection point P that is the sought point of the seam peaking, and the sought point’s seam peaking height h is the (perpendicular) distance of the intersection point P from the two straight lines in relation to an ideal circular geometry of the inside of the pipe.

The seam peaking h can partly be understood as the result of imperfect welding preparation. The sheet material from which the pipe is to be welded must be bent into a tubular shape during the welding preparation. Due to difficulties in the engagement of the bending tools or the transmission of force, the edges to be welded may have a too small curvature, which then forms as a seam peaking h. The above-mentioned linear extrapolation (or the calculation based on FIG. 3) assumes that the sheet material is not bent at all at the welding edge, as a straight extension from the areas b to the seam peaking point P is assumed. With good work preparation, it is to be expected that a seam peaking h determined in this way should always be slightly larger than the actual seam peaking, as at least a partial bending of the material at the weld edge can be assumed. This possibly rather too large value can be understood as a safety factor and makes this method superior to other methods in which a seam peaking h is approximated as accurately as possible, but without being able to sufficiently exclude the possibility that the real seam peaking h may be greater than the calculated value.

Due to the mobility and rotatability of the sensor carriers 20 described above, the distances measured by the ultrasonic sensors 25 cannot be used directly to calculate the seam peaking height h. This is because the sensor carriers 20 are pressed outwards by the aforementioned springs and therefore the relative distance from the sensors to the inner wall of the pipe is of no particular significance. This also applies because the sensor supports can be inclined if, for example, one of the skids (or both) partially dips into the seam peaking h and/or the other skid rests on an undeformed part of the inner tube geometry. The method described above with the first step of determining the gradients has the initial advantage that the radial position of the sensor carriers 20 (i.e. the absolute values of the measured distances) is not included in the calculation of the seam peaking h, but only the measured gradients of the pipe wall on both sides of the weld seam are used to calculate the seam peaking angle. There is also the further advantage that an inclined position of the sensor support can also be subtracted out, as will be explained below.

In some cases, an “inward seam peaking” can occur, i.e. a dimensional deviation of the pipe inwards, whereby the seam peaking has a negative sign, as shown in FIG. 4. In its upper part, an ideal circular geometry is initially shown in grey and radially inwardly displaced measurement results are shown in points adjacent to the weld seam. Analogously to the considerations of the measured value evaluation according to FIG. 2, only the areas b of measurement results are used for the seam peaking calculation. It can be seen from the upper part of this figure that the inferred values lie on an arcuate path, which makes it difficult to extrapolate the values for the formation of an intersection point P, which corresponds to the seam peaking h. A linear extrapolation would systematically lead to too low (negative) seam peaking heights, whereby considerable deviations are also possible. Instead, a kind of mirroring is performed on the ideal circular geometry, resulting in the image in the lower half of FIG. 4. The “mirrored” values lie largely on a straight line, so that (as already explained) an average gradient can be calculated via a (linear) regression and correspondingly also an intersection point P of the seam peaking h. However, this intersection point must be mirrored again in order to obtain the internal seam peaking. While the mirroring can be calculated in a simplified calculation, e.g. via an offset of the plumbed distances from the circular path, a Kelvin transformation can preferably also be used for this, which promises improved mathematical accuracy, as the Kelvin transformation is true to the angle.

It also applies that an offset and/or angular deviations of different sensor carriers 20 from each other can be subtracted out, as can be seen below with reference to FIG. 5 and its detail A in FIG. 6. FIG. 5 initially shows several vertical lines between which the sensor carriers 20 are located and which therefore represent the transition line between two sensor carriers 20. Their measurement results are shown as points in the lower half of the diagram, although only the results that are also used to calculate the seam peaking due to their position are shown here. These are six points to the right of the 0 mm position on the welding line, which are largely on a straight line or can be approximated to it without any problems. To the left of the welding line, in a range from −15 mm to −35 mm, there are six measuring points, which are enlarged in detail A of FIG. 6 and are therefore easier to see. The measured values on the right-hand side are recorded exclusively by sensors located on a sensor carrier 20, so that the linear regression can be carried out easily, as shown in FIG. 8. According to FIG. 6, of the measured values on the left-hand side of the seam peaking, the three measured values on the right-hand side also originate from sensors on this sensor carrier 20, as indicated by the vertical boundary line. The three measured values to the left, on the other hand, originate from measured values of a neighbouring sensor carrier 20, whereby a certain inconsistency of the measured values results. This is because there may be a radial offset and a changed inclination between the sensor carriers 20. This inconsistency can be recognised mathematically by determining the gradient of two neighbouring measuring points, as shown in FIG. 9. The six measuring points in FIG. 7 therefore result in the five gradients in FIG. 9. The value of the gradient that lies in the transition from the sensor supports 20 is significantly higher than the others and is to be considered an outlier. The outlier can be eliminated, for example, by determining the median value of the individual gradients when calculating the mean gradient.

The measured values that are determined within a sensor carrier, on the other hand, have practically no outliers according to FIG. 8, so that their gradients according to FIG. 10 are largely identical.

In an alternative calculation, the outlier can also be determined first, as explained with the aid of FIG. 9, and only measured values that originate from the same sensor carrier, which lies decisively in the area of the seam peaking, can be used to determine the gradient, as shown with the thick line of the gradient in FIG. 7, which runs through three measuring points on the right-hand side.

In an alternative calculation, the control unit can also take into account that only measurement results from sensors on the same sensor carrier are used. And if at least two measured values are available on the left and right sides of the weld seam, i.e. the expected seam peaking, this may already be sufficient to calculate the gradients. The use of more measured values increases the accuracy of the determination of the seam peaking.

Since a large number of measurements are carried out with the pig, which is axially displaced in the pipe, and since it can be assumed that the seam peaking in the pipe axial direction is rather constant or at least changes gradually without jumps, measured values obtained at different axial positions of the pig can also be used to determine the seam peaking. Alternatively, measured values from different axial positions of the pig can be used to determine an average seam peaking angle. Or a seam peaking can be calculated for one axial position of the pig in each case (as described), which is then averaged with other seam peakings for other axial positions of the pig to form an average seam peaking.

In one embodiment of the invention, the sensors can be evenly distributed around the circumference of the inside of the pipe. This can be designed in such a way that the sensor carriers are practically edge-free. Or the sensor carriers can be designed in, for example, two circumferential rows, with the two rows being offset axially (i.e. in the longitudinal direction of the pipe) and the rows being twisted tangentially so that the inner wall of the pipe is evenly covered with sensors. Alternatively, in an alternative embodiment of the invention, measured values recorded on or adjacent to the weld seam can be ignored. This is harmless, as measured values that are recorded directly on the weld seam do not contain any meaningful information about the seam peaking due to the weld bead. Even if there is no seam peaking in the pipe, the method may still indicate a seam peaking angle >0° and therefore a seam peaking height >0 mm. The method therefore assumes a minimum seam peaking height depending on the pipe diameter and the width of the gap at the longitudinal seam. Geometric considerations can be used to calculate sensitivity curves for the method, from which the minimum values for the seam peaking angle and height can be derived. In the picture below, this was calculated as an example for a 20" pipe and a gap width of 20 mm. In this example, the method is not sensitive to seam peaking angles in the range of approximately +/−10° or a seam peaking height of approximately +/−1 mm.

REFERENCE SIGNS

10 Pig
12 Base body
20 Sensor carrier
22 Arm
25 Sensor or ultrasonic sensor
26 Skid
P Sought point of the seam peaking
b area of measurement used for seam peaking calculation
h Seam peaking, or its height
d Seam peaking width
Θ Half seam peaking angle

The invention claimed is:

1. A method for determining a seam peaking of a pipeline comprising, measuring, with an array of ultrasonic sensors, values of an internal pipe geometry adjacent to a sought point of the seam peaking, at which the measurement of meaningful measured values is difficult or impossible due to a weld seam present there, wherein the sought point of the seam peaking is an indicator of a deviation from a theoretical roundness of the pipe that can lead to increased crack formation in and around the weld seam, wherein at least two measured values are recorded on either side of the sought point of the seam peaking in a circumferential direction of the pipe, determining a trend from the measured values, based on the trend, determining a value of the seam peaking, determining an angular position of an inner wall of the pipe on either side of the sought point, and determining, via an intersection of the angular position, the seam peaking of the sought point of the seam peaking.

2. The method according to claim 1, wherein values from the measured values, that were measured directly at the weld seam are not used by the method for determining the seam peaking.

3. The method according to claim 1, further comprising: comparing neighbouring measured values of the measured values with one another and determining outliers, wherein the outliers are an indication of a presence of the weld seam at a specific location, wherein the presence of the weld seam at the specific location is inferred from measured data from one or more previous measurements at other axial locations of the pipeline, and wherein the outliers and measured values determined in this way at locations of an expected weld seam are not used for the seam peaking determination.

4. The method according to claim 1, wherein at least two points of an inner surface of the pipe are determined in an circumferential direction of the pipe on either side of the sought point of the seam peaking, which are each approximated by interpolation to a straight line whose point of intersection corresponds to the seam peaking.

5. The method according to claim 1, wherein the trend is determined by using one of the following steps:

a) determining, using a plurality of measured values via a linear regression, the angular position or a straight line;

b) determining, by each neighbouring sensor of a sensor carrier, an inclination of the inner wall of the pipe, and determining, based on a median value of the inclination, the angular position or the straight line; and c) determining, by spatially neighbouring sensors of the sensor carrier, an inclination of an inner wall of the pipe, checking whether the inclinations contain an outlier, and wherein only inclinations are used to form a mean value which, seen from the outlier, lie adjacent to the sought point of the seam peaking.

6. The method according to claim 1, wherein in an event that the seam peaking is provided with a negative sign and corresponds to a retraction, determining a mirroring of the measured values over an ideal circular arc geometry, determining the seam peaking, determining a mirroring over an ideal circular arc geometry for the determined value of the seam peaking and an extent of the retraction, is determined therefrom, where in the mirrorings are determined using a Kelvin transformation.

7. The method according to claim 1, wherein a sensor carrier comprises a plurality of sensors, and the sensor carrier has a width in a circumferential direction of the pipe, which corresponds to at least 70% of an expected seam peaking width, wherein the width of the sensor carrier corresponds to a maximum of 130% of the expected seam peaking width.

8. A pig for determining a wall thickness measurement and/or a geometry measurement and/or a crack measurement in a pipe, the pig having a sensor carrier that comprises a plurality of sensors, and a control system and/or software which is configured to perform the method according to claim 1.

9. A computer program product comprising a non-transitory computer-readable medium loadable into a program memory, and comprising program instructions to carry out all the steps of a method according to claim 1 when the program is executed.

* * * * *